United States Patent [19]

Loehman

[11] 4,347,089
[45] Aug. 31, 1982

[54] METHOD FOR BONDING SILICON NITRIDE

[75] Inventor: Ronald E. Loehman, Palo Alto, Calif.

[73] Assignee: SRI International, Menlo Park, Calif.

[21] Appl. No.: 288,125

[22] Filed: Jul. 29, 1981

[51] Int. Cl.³ .................... C03C 29/00; C04B 33/34; C04B 37/00
[52] U.S. Cl. .......................................... 156/89; 65/36; 156/325; 428/420
[58] Field of Search .................... 428/420, 428, 539.5, 428/627; 106/39.5; 156/89, 325, 306.6; 65/36, 43; 423/344

[56] References Cited

U.S. PATENT DOCUMENTS 3,607,613  9/1971  Passmore et al. ................ 156/89 X
3,966,885  6/1976  May .................................. 156/89 X Primary Examiner—William A. Powell
Attorney, Agent, or Firm—Urban H. Faubion

[57] ABSTRACT

A method for forming a homogeneous bond between silicon nitride ceramics is disclosed which comprises melting a bonding composition placed between the surfaces to be bonded. The bonding composition is specifically selected to provide in the bond or joint the same chemical constituents found intergranularly in the silicon nitride materials to be bonded. The resultant bond is as strong or stronger than the silicon nitride materials bonded.

10 Claims, 1 Drawing Figure

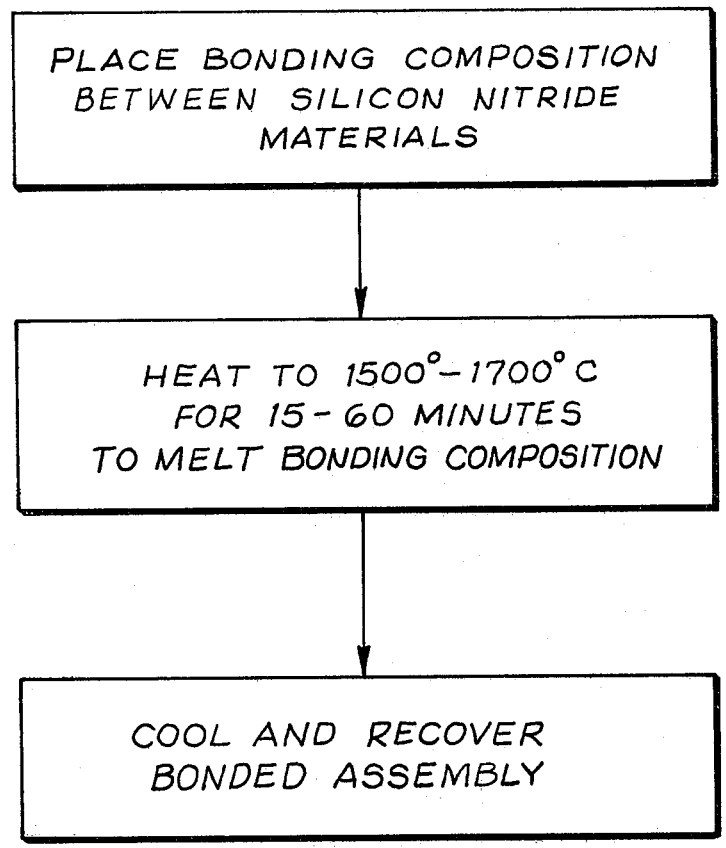
FIG_1

METHOD FOR BONDING SILICON NITRIDE

BACKGROUND OF THE INVENTION

Silicon nitride ceramics are being widely considered as materials for components in advanced energy conversion systems due to their high temperature properties, including resistance to corrosion and erosion. The use of silicon nitride materials permits higher operating temperatures in such processes, permitting increased engine efficiency, more economic use of high grade fuels and the possibility of burning lower grade fuels derived from residual oils and coal. The gain in efficiency resulting from higher gas inlet temperatures has led to the emergence of the small ceramic gas turbine as a serious competitor to the internal combustion engine for many automotive applications. Silicon nitride materials, for the same reasons, are being considered for use in advanced Sterling engines and high temperature diesel engines.

However, despite the attractive properties of silicon nitride in such high technology applications, certain problems still exist in the manufacture and fabrication of silicon nitride components which inhibit its widespread use.

In many instances it is impractical to fabricate components in one piece. In such cases it is necessary to join parts together either mechanically or by some chemical bonding technique. The mechanical joining obviously is impractical or impossible in many high temperature applications.

Bonding techniques to date have not been as successful as desired. Ideally any technique for bonding or sealing silicon nitride to itself should produce a bond at least as strong and as chemically resistant as the materials joined. This has proved difficult to achieve in practice. Methods have been used which include brazing, reactive solid state sintering, and sealing with reactive liquids. For example, metal alloys with the proper thermal expansion coefficients and the ability to wet silicon nitride have been used to braze silicon nitride to itself or to other materials. However, in most cases the metal bond is neither as refractory nor as resistant to oxidation and chemical attack as the silicon nitride.

In the case of reaction bonded silicon nitride, joining can be accomplished by nitriding a porous layer of silicon placed between the silicon nitride pieces to be joined together. However, this technique is limited to relatively small cross sectional areas at the bond and cannot be used for other types of silicon nitride such as hot pressed or sintered material.

It is also possible to satisfactorily join silicon nitride parts together by hot pressing the parts in direct contact or with a layer of suitable bonding material between them. While such a bond is possible in principle, it is extremely impractical in practice due to the complexity and expense of the procedure, including the need for proper alignment of the parts to be joined. Also the components frequently fracture or deform while being joined.

Other sealing techniques not requiring the use of such high pressures have also been developed. Typically such processes involve the use of other refractory materials such as alkaline earth-aluminum silicate glasses. However, these materials may not provide reliable bonds because of potential mismatch of the thermal expansion coefficients of the glass and the materials sealed, and much lower mechanical strength in the glass bond compared with metal or ceramic bonds.

It has now been discovered that a homogeneous bond can be formed between silicon nitride materials without encountering the problems discussed.

SUMMARY OF THE INVENTION

In accordance with the invention is has now been discovered that a homogeneous bond can be formed between two silicon nitride materials by placing therebetween a glass or ceramic material selected to provide, in the joint, the same chemical constituents as those found intergranularly in the silicon nitride material. The bonding compositions and the silicon nitride materials are heated to the melting temperature of the bonding composition, permitting it to react with the silicon nitride materials. The resultant bond is found to be as strong or stronger than the silicon nitride materials bonded.

BRIEF DESCRIPTION OF THE DRAWING

FIG. 1 of the drawing is a flowsheet illustrating the process of the invention.

DESCRIPTION

In accordance with the invention, silicon nitride materials are homogeneously bonded together using a bonding composition selected to provide, in the joint, the same chemical constituents as those found intergranularly in the silicon nitride. The bonding composition and the silicon nitride materials are heated to the melting point of the bonding composition to melt the bonding composition and permit it to react with the silicon nitride material adjacent the surfaces to be bonded.

The bonding composition, in the preferred embodiment, comprises either an oxynitride, primarily a silicon oxynitride, or a material, such as an oxide, capable of reacting with the silicon nitride material adjacent the joint to form a silicon oxynitride in situ. However, other materials may also be present in the bonding composition, such as fluxing agents, if these materials are present in the silicon nitride materials to be joined. In the preferred embodiment the bonding composition is selected to provide, in the joint, the same chemical constituents as found intergranularly in the silicon nitride materials to be joined. However, if desirable, it is within the scope of the invention to specifically include or exclude materials in the bonding composition to crystallize specific oxide or oxynitride compounds in the boundary which may or may not be found in the grain boundary phase of the silicon nitride material.

The bonding composition may be in the form of a glass or a ceramic since it will be melted during the bonding process. The bonding composition must be an oxide or oxynitride that will form a high temperature liquid in which silicon nitride is appreciably soluble. Furthermore, for strongest bonding the bonding composition must be capable of forming solid phases at the interface compatible with the original silicon nitride. In particular, the thermal expansion coefficients must be matched so that unacceptable stresses do not result when the joined material is cooled.

The bonding composition is initially placed between the surfaces to be joined without any external pressure other than the pressure exerted by the upper silicon nitride material in the vertical stack. The thickness of the bonding composition is not crucial but should be sufficient to provide enough molten composition to penetrate to a depth equal to at least five times the average silicon nitride grain diameter into the silicon nitride material to be joined.

The assembly is heated to the melting point of the bonding composition and then maintained at this temperature for a time period sufficient to permit diffusion of the molten bonding composition into the silicon nitride material. Normally this will require heating the assembly to a temperature of about 1500°–1700° C., depending on the particular bonding composition, and then maintaining this temperature for about 15 minutes to an hour to permit reaction between the molten bonding composition and the adjacent silicon nitride material.

It should be noted here that a longer time period or a higher temperature or a combination of both may be needed to provide sufficient melting of the bonding composition and reaction with the silicon nitride. For example, it has been found that a sintered silicon nitride was bonded satisfactorily by heating it for only 15 minutes, while the same bonding composition heated to the same temperature for the same time period did not sufficiently react with a hot pressed silicon nitride, indicating that a higher temperature or longer time period was necessary.

If the bond formed in accordance with the invention is a glassy bond, it may be subsequently crystallized to form a stronger bond by reheating to a range of 1000°–1400° C. The time and temperature needed for crystallization will vary depending upon the material.

While it is not intended that the invention be limited to bound by any theory of operation, it is believed that the reaction between the molten bonding composition and the adjacent silicon nitride comprises a partial dissolution of the silicon nitride in the molten bonding composition followed by a recrystallization of the initial amorphous and alpha phase silicon nitride into a denser beta or beta prime phase. The structure obtained on cooling is an array of silicon nitride particles bound together by an intergranular layer of oxynitrides closely resembling the grain boundary phase of the adjacent silicon nitride material. This theory explains the homogeneous nature as well as the strength of the resulting bond.

It should be further noted in this regard that the bonding of reaction bonded silicon nitride materials differs in principle from that discussed above in that there is no grain boundary phase, thus inevitably producing a heterogeneous interface. However, in applying the invention to reaction bonded silicon nitride the objective is to create a diffuse reaction zone at the interface in which the porous, relatively weak reaction bonded silicon nitride is converted to a dense strong mixture of silicon nitride and silicon oxynitride phases adjacent the bond. This, however, can cause thermal stresses requiring more care in initial cooling of the bonded assembly.

The following example will serve to further illustrate the invention:

EXAMPLE

Silicon nitride material initially sintered using 4 weight percent yttrium oxide and 4 weight percent aluminum oxide was cut into samples of 3×3×0.5 cm plates using diamond tools. A 0.5 mm layer of an oxynitride glass bonding composition chosen to match the grain boundary phase of the sintered silicon nitride material was placed in between the 3×0.5 cm faces of the silicon nitride samples.

The assembly was heated under nitrogen in a graphite resistance furnace for 25 minutes at 1650° C. No external pressure was applied to the assembly.

The bonded assembly was then cooled to room temperature and then cut into test bars of 0.3×0.03×6 cm with the plane of the joint in the center of the test bar, perpendicular to the long direction. Each of the bars was broken in a four point loading fixture at room temperature on a test machine using a loading rate of 12.45 Nt/sec (2.8 lb/sec). The values obtained at the time of breakage are listed in the table. A representative selection of the broken bars was examined in a scanning electron microscope (SEM) equipped with an energy dispersive x-ray analyzer. The two strongest samples were found to have fractured in the bulk ceramic, leaving the joint intact. Thus, these two bonds are at least as strong as the values listed in the table. More importantly, the bond formed is actually stronger than the materials joined.

TABLE

| Sample | Temp. (°C.) | Time (Min.) | Breaking Strength | |
|---|---|---|---|---|
| | | | MPa | Kpsi |
| 1 | 1650 | 25 | 361 | 52.4 |
| 2 | 1650 | 25 | 376 | 54.5 |
| 3 | 1650 | 25 | 310 | 45.0 |

Thus, the invention provides a method for joining together silicon nitride materials to form a bond at least as strong as the materials joined.

Having thus described the invention, what is claimed is:

1. A method of joining silicon nitride materials to form a thermally matched bond containing oxynitrides which comprises:
   a. providing a glass or ceramic bonding composition capable of providing oxynitrides when melted in contact with silicon nitride;
   b. placing said bonding composition between the materials to be joined;
   c. heating said composition and materials to a temperature sufficient to melt the composition;
   d. maintaining said temperature for a time period sufficient to permit a portion of said materials to react with said melted composition;
   e. thereafter cooling the joined materials to recover bonded assembly.

2. The method of claim 1 wherein said bonding composition consists essentially of the same chemical constituents as found in the grain boundary phase of the materials to be joined.

3. The method of claim 2 wherein said bonding composition consists essentially of a silicon oxynitride.

4. The method of claim 2 wherein said composition and materials are heated to a temperature of at least 1500° C.

5. The method of claim 4 wherein said temperature is maintained for at least 30 minutes to permit sufficient dissolving in said melted composition of silicon nitride from said materials to be joined to promote a homogeneous bond.

6. The method of claim 5 wherein said joining is carried out in an inert atmosphere.

7. The method of claim 6 wherein said joining is carried out in a nitrogen atmosphere.

8. The method of claim 1 wherein said reaction between said melted composition and said silicon nitride materials comprises a partial dissolving of said silicon nitride materials.

9. The method of claim 8 wherein said reaction further comprises a precipitation of said dissolved silicon nitride material as one or more refractory phases other than the initial phase.

10. A method for homogeneously bonding together two or more pieces of silicon nitride material containing oxynitrides which comprises:

a. providing a glass bonding composition consisting essentially of a silicon oxynitride;
b. placing said silicon oxynitride glass composition between said silicon nitride materials to be bonded together;
c. heating said composition and said materials to a temperature of at least 1500° C. and maintaining said composition and materials at this temperature for at least 15 minutes to melt said composition and to permit dissolving of said silicon nitride material into said adjacent molten composition;
d. thereafter cooling the bonded materials to recover a homogeneously bonded assembly.

* * * * *